Nov. 18, 1969 R. STUART-WILLIAMS ET AL 3,479,664

SERVO POSITIONING SYSTEM

Filed Dec. 28, 1965 3 Sheets-Sheet 1

INVENTORS
SUNG PAL CHUR
RAYMOND STUART-WILLIAMS
BY Samuel Lindenberg
Arthur Freilich
ATTORNEYS

SERVO POSITIONING SYSTEM

Filed Dec. 28, 1965 3 Sheets-Sheet 2

INVENTORS
SUNG PAL CHUR
RAYMOND STUART-WILLIAMS
BY Samuel Lindenberg
Arthur Freilich
ATTORNEYS

SERVO POSITIONING SYSTEM

Filed Dec. 28, 1965 3 Sheets-Sheet 3

INVENTORS
SUNG PAL CHUR
RAYMOND STUART-WILLIAMS
BY Samuel Lindenberg
Arthur Frieblich
ATTORNEYS United States Patent Office 3,479,664

Patented Nov. 18, 1969

3,479,664

SERVO POSITIONING SYSTEM

Raymond Stuart-Williams, Pacific Palisades, and Sung Pal Chur, Inglewood, Calif., assignors to Data Products Corporation, Culver City, Calif., a corporation of Delaware Filed Dec. 28, 1965, Ser. No. 517,050

Int. Cl. G11b *5/00*

U.S. Cl. 340—174.1 5 Claims

ABSTRACT OF THE DISCLOSURE

A magnetic disc storage system including a servo system for accurately positioning read heads. The servo system employs a positioning surface defining different reference rows thereon, each row storing a signal of the same frequency. Preferably, signals stored in adjacent rows are of opposite phase with the signal in one row being characterized by a larger positive slope than negative slope, and the signal in an adjacent row being characterized by a large negative slope than positive slope. The signal components read by the reference head adjacent the positioning surface are differentiated and compared.

This invention relates generally to data recording systems and more particularly to means for accurately positioning movable heads in moving medium recording systems.

Magnetic disc storage systems are finding increasing usage in digital data processing systems as mass memories. Essentially, all known disc storage systems are comprised of a plurality of discs stacked on a common axis. Drive means are provided for rotating the entire disc stack at a uniform rate about the common axis. Usually, both surfaces of each disc are coated with a magnetic recording material and information is adapted to be stored in annular tracks defined coaxially on each surface. Oftentimes, over 100 tracks are defined on each disc surface and because, for most applications, it is usually too expensive to provide a different read/write head for each track, a lesser number of heads, as few as one, are provided per disc surface with means also being provided for moving the head to a position adjacent to a selected track.

In order to get the maximum storage capacity for any fixed cost, it is desirable, of course, that the discs contain the maximum number of bits and tracks per inch. As the track density increases, however, it becomes increasingly difficult to repeatably precisely position the heads. Accordingly, it is clear that the upper track density limit in most state of the art systems is determined by how precisely the heads can be positioned over a selected track. For example, if the heads are not positioned precisely the same for reading as they were for writing, then the signal level obtainable when reading will be reduced, the signal-to-noise ratio will deteriorate, and bit dropout may occur. Positioning inaccuracy in state of the art devices is attributable to many factors including temperature conditions, initial reference set up errors bearing eccentricities, etc.

In an effort to more precisely position heads, servo systems have been incorporated in disc systems to precisely position the head over a track center line after an initial coarse positioning is established. More particularly, the heads are initially coarsely positioned over the track by a positioner driven by means of a servo system. The selected track is usually represented by a digital address supplied to the position servo. The servo system then determines whether the heads are over a track center line and if they are not moves them in or out as is necessary. Such servo systems usually employ a surface on one of the discs, hereinafter called the positioning surface, to define a plurality of tracks or annular rows which are shifted relative to the data tracks on the other disc surfaces by the width of half a track. Thus, each annular boundary line separating rows on the positioning surface is aligned with a data track center line. First and second signals of different frequencies are recorded in alternate rows on the positioning surface. When the heads over the data tracks are properly positioned over their center lines, the head over the positioning surface will be over a boundary line and thus will provide a signal having first and second signal components of equal amplitude. If the amplitudes of the first and second signal components are not equal, then the heads should be moved either in or out until the amplitudes are equal. It has been found, however, that different frequency signals recorded at the same amplitude tend to produce different amplitudes on playback and thus the positioning precision obtainable with such systems is not as good as one would like.

In view of the foregoing, it is an object of the present invention to provide an improved means for positioning heads in a moving medium recording system.

Briefly, in accordance with the present invention, a servo system is provided which employs a positioning surface defining different rows thereon, each row storing a signal of the same frequency components. Each of the annular boundaries between a pair of different rows is aligned with the center line of a different data track.

In a first embodiment of the invention, the signals are recorded on the positioning surface in a checker board pattern such that spaced short signal bursts are recorded in each positioning surface row but with adjacent rows having spaces and signal bursts in alignment. By initially examining the amplitude of the signal derived from the row to one side of the head and by comparing it with the amplitude of the signal derived from the row to the other side of the head, the direction in which the head should be moved to equalize those signals can be determined.

In a second embodiment of the invention, signals of the same frequency but of opposite phase are employed in adjacent rows. The amplitudes of these signals can be distinguished and the head can thereafter be moved to equalize those amplitudes. In a still further embodiment of the invention, signals of the same frequency but of opposite phase are employed in the checker board pattern as in the first embodiment.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 4(*b*) illustrates a signal showing marker pulses generated to define the radial boundary line between adjacent sectors on the surface of FIGURE 3;

Figure 1:
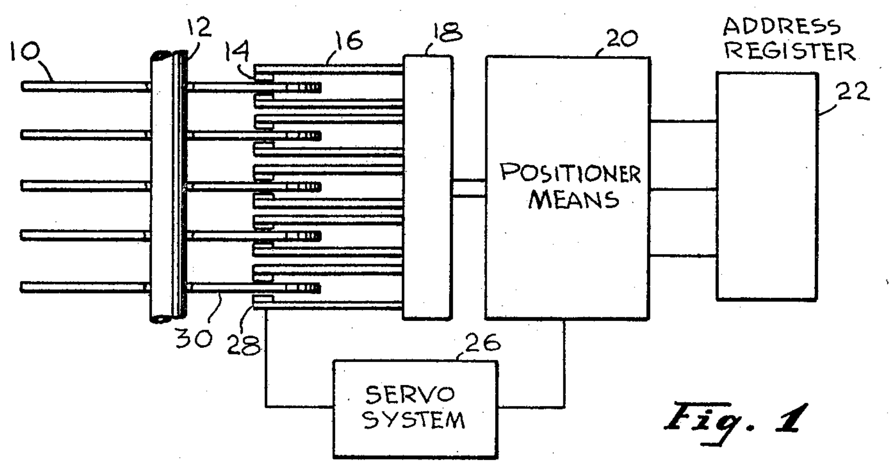
FIGURE 1 is a schematic illustration of a disc recording system incorporating the present invention.

Attention is now called to FIGURE 1 of the drawings which schematically illustrates a disc storage system incorporating the teachings of the present invention. Briefly, the system includes a plurality of discs 10 mounted in stacked relationship on a common shaft 12. Each of the discs 10 is secured to the shaft 12 so that when the shaft rotates, the discs are rotated with it. Each of the discs 10 is usually provided with an upper and lower recording surface which most commonly comprises a magnetic recording medium. The teachings of the present invention however are also applicable to other types of recording media such as thermoplastic recording. A plurality of heads 14 are provided, each being carried by a different arm 16 proximate to a disc surface. The heads 14 are all preferably in vertical alignment. The arms 16 are secured to a back bar 18 which is adapted to be moved by a positioner means 20 perpendicularly to the shaft 12. That is, the positioner means 20 is able to position the back bar 18 at any one of a plurality of distances from the shaft 12 to thus permit the heads 14 to be positioned over any one of a plurality of annular tracks defined on each of the disc surfaces.

The positioner means 20 is responsive to an address stored in address register 22. More particularly, a digital address can be stored in the address register 22 which defines any one of a plurality of track positions. The positioner means 20 performs a digital-to-analog conversion and positions the back bar such that all of the heads 14 are in alignment with the track identified by the digital information in the address register. The address register is comprised of a sufficient number of binary stages to permit selection of any one of the tracks. Thus, if 128 tracks are defined on each disc surface, then the address register must contain seven binary stages. The 128 tracks can be considered as being comprised of alternate odd and even tracks. The state of the least significant binary stage of the address register indicates whether an odd or even track is being selected.

Figure 2:
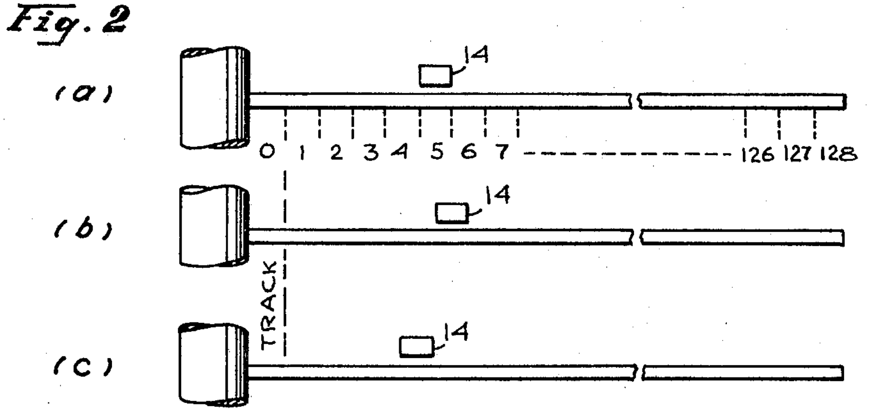
FIGURE 2 is a schematic illustration showing the different positions a head can assume with respect to a selected disc track.

FIGURE 2 illustrates a typical disc in somewhat more detail than FIGURE 1. FIGURE 2(*a*) illustrates a head 14 which is positioned properly over track 5 inasmuch as it is centered with respect to the track center line. FIGURES 2(*b*) and 2(*c*) illustrate inaccurate positioning of the head 14 with respect to track 5.

As previously noted herein, in order to provide maximum storage per dollar, it is necessary to utilize as high a track recording density as possible. However, as noted, as the track density increases, the precision with which the positioner means 20 operates must likewise be increased to prevent positioning inaccuracies as represented by FIGURES 2(*b*) and 2(*c*). Such positioning inaccuracies are oftentimes intolerable. Consider for example that information is written on track 5 when the head 14 is properly centered as shown in FIGURE 2(*a*). If the information that had been written is then checked with the head positioned as shown in FIGURE 2(*b*), the signal that is obtained is somewhat less than would be obtained if the head was positioned exactly the same as when writing occurred. At a subsequent time when the head is positioned as shown in FIGURE 2(*c*), even less of the original track may be read. Thus, it may occur that a section of track read in FIGURE 2(c) may contain an imperfection which was not detected during checking when the head was positioned as shown in FIGURE 2(*b*). Accordingly, it should be clear that positioning inaccuracies of the types demonstrated in FIGURES 2(*b*) and 2(*c*) reduce the output signal levels obtainable upon reading and degrade the signal-to-noise ratios.

In order to precisely position the heads 14 over the center of a selected track, a servo system 26 is provided in accordance with the present invention. The servo system 26 is responsive to signals read by a positioning head 28 which is positioned proximate to a positioning surface 30 which is assumed herein to be the bottom surface of the lower disc 10. In response to information provided by head 28, the servo system 26 is able to determine whether the heads are properly centered with respect to the tracks. In the event the heads are not accurately positioned, the servo system 26 provides an error signal to the positioner means 20 in order to move the heads until the error is reduced to zero.

Figure 3:
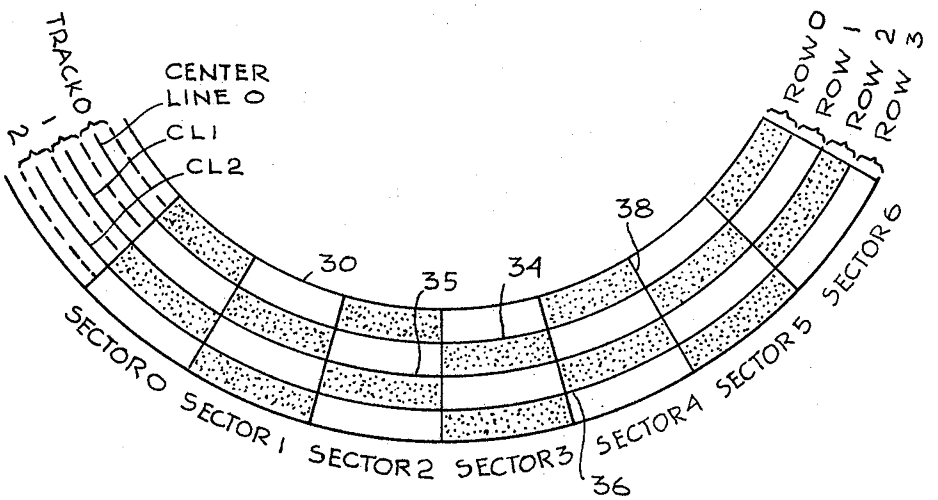
FIGURE 3 is a schematic illustration showing the manner in which data can be recorded on a disc positioning surface in accordance with a first embodiment of the invention.
Figure 4A:
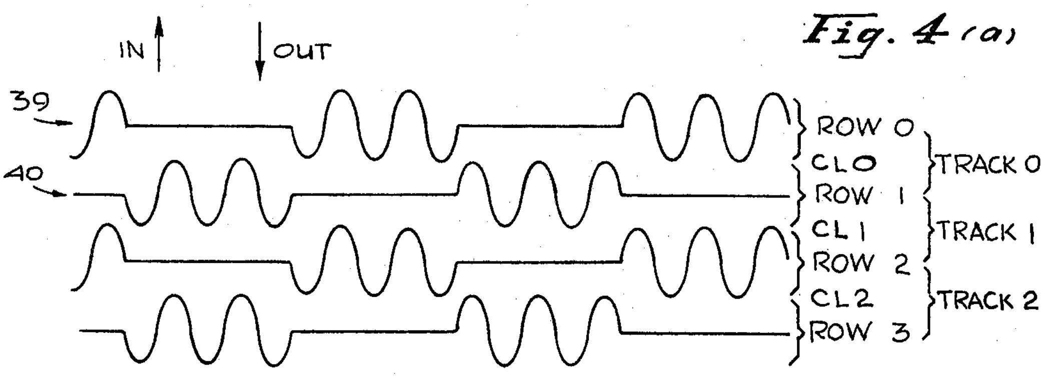
FIGURE 4(*a*) illustrates typical signals which can be recorded on the disc positioning surface of FIGURE 3.
Figure 4B:
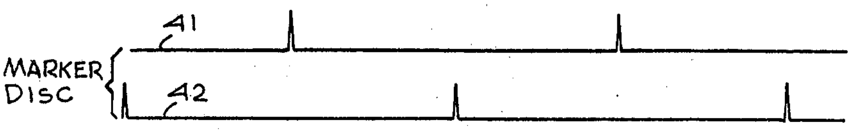

A positioning surface 30 in accordance with a first embodiment of the invention is illustrated in FIGURES 3 and 4(*a*). FIGURE 3 illustrates a portion of a disc surface storing positioning information. More particularly, the surface 30 shown in FIGURE 3 defines a plurality of annular rows, four rows being shown. Rows 0 and 2 are considered even rows and rows 1 and 3 are considered odd rows. The rows are separated by annular boundary lines 34, 35 and 36 which are aligned with track center lines defined on other disc surfaces. More particularly, boundary line 34 is aligned with center line 0 defined in track 0, an even track, on each of the other disc surfaces. Boundary line 35 is aligned with the center line of track 1, an odd track, defined on each of the other disc surfaces. Similarly, boundary line 36 is aligned with the center line of track 2, an even track, on each of the other disc surfaces.

The positioning surface 30 shown in FIGURE 3 is also divided into sectors which are separated by radial boundary lines 38. As will be discussed in greater detail in connection with FIGURE 4(*a*), a first signal is recorded in each of the even rows on the positioning surface 30 and a second signal in each of the odd rows. The signals are recorded in short bursts filling alternate sectors. Thus, a first signal is recorded in sectors 0, 2, 4, and 6 of the even rows, i.e. rows 0 and 2. A second signal is recorded in sectors 1, 3, and 5 of the odd rows, i.e. rows 1 and 3.

When the heads 14 are properly centered over a selected track, the head 28 should straddle one of the annular boundary lines and thus read equal amplitude signals from the rows on either side of that boundary line. If the first and second signals recorded in the even and odd rows respectively are not of the same frequency, then the signals read by the positioning head 28 will tend to be unequal even though the head is straddling an annular boundary line and the first and second signals were recorded with the same amplitude. Accordingly, in accordance with the invention it is significant that the first and second signals respectively recorded in the even and odd rows of the positioning surface 30 be of the same frequency.

Attention is now called to FIGURE 4(*a*) which illustrates in greater detail the first and second signals 39, 40 recorded in the rows of a portion of the positioning surface 30. It will be noted that the first signal 39 recorded in rows 0 and 2 is a sine wave having a frequency $f_1$ and is identical to the second signal 40 recorded in rows 1 and 3. More particularly, it is emphasized that in accordance with the first embodiment of the invention, the first and second signals must have the same frequency but can have the same or different phase relationship. Although only a few cycles of each signal are shown as being recorded in each burst, in actuality, many cycles are recorded in each short burst so that where a burst begins in a cycle is unimportant.

FIGURE 4(*b*) illustrates two waveforms 41, 42 comprised of pulses which are generated coincident with the passage of a radial boundary line 38 passed the positioning head 28. Waveform 41 provides pulses immediately prior to odd sectors and waveform 42 provides pulses immediately prior to even sectors. These pulses can be provided by separate heads 43, 44 mounted proximate to a surface having pulses recorded thereon coincident with the boundary lines 38.

Figure 5:
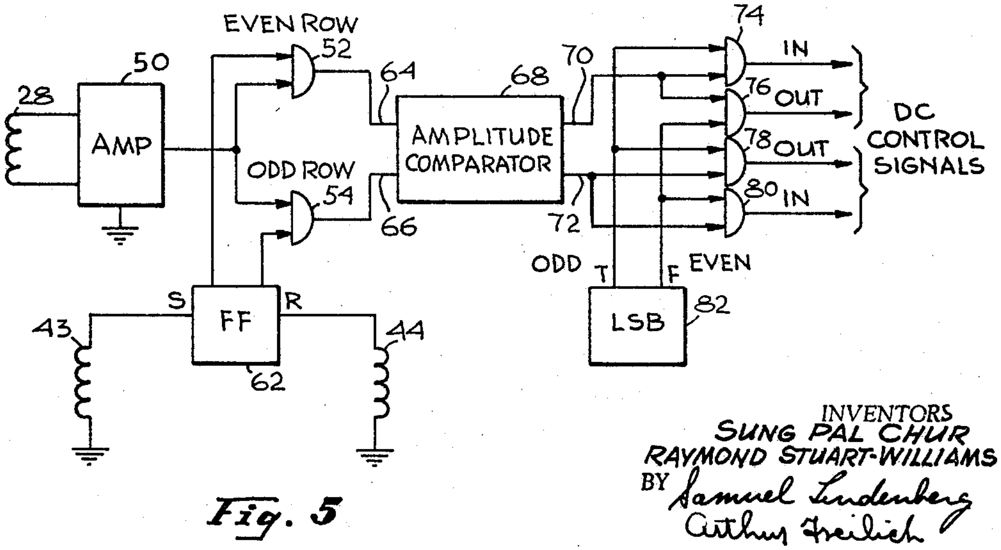
FIGURE 5 is a block diagram illustrating circuit apparatus responsive to signals provided by a positioning head used in conjunction with a positioning surface of the type illustrated in FIGURE 4(*a*) for controlling the position of that head.

FIGURE 5 illustrates a circuit means responsive to information derived from a positioning head 28 positioned proximate to a positioning surface 30 of the type shown in FIGURE 4(*a*). Essentially, the circuit means of FIGURE 5 operates in accordance with the premise that the signal provided by head 28 after a first marker pulse from head 43 represents the first signal 39 recorded in one of the even rows and the signal derived from the head 28 after the next marker pulse from head 44 represents the second signal 40 recorded in one of the odd rows. Several bursts of these signals are applied to an amplitude comparator circuit 68. If the amplitude of the signal derived from one of the rows is substantially greater than the signal derived from the adjacent row, then an error output signal is provided to move the positioning head 28 in or out to reduce the error signal. The direction of head movement is determined by whether the track being sought is an even or odd track. As noted, this is indicated by the least significant stage of the address register 22.

FIGURE 5 will now be considered in greater detail. The head 28 is connected to the input of an amplifier 50 whose output is connected to the input of first and second And gates 52 and 54. The gates 52 and 54 are alternately enabled in response to the occurrence of the marker pulses of FIGURE 4(*b*). This is accomplished by connecting the heads 43, 44 which are disposed to read the marker pulse surface previously mentioned to the set and reset inputs of flip-flop 62. The true and false output terminals of the flip-flop 62 are respectively connected to the inputs of And gates 52 and 54. In response to the occurrence of each marker pulse, the state of the flip-flop 62 is changed to thus alternately enable And gates 52 and 54. The outputs of And gates 52 and 54 are respectively connected to input terminals 64 and 66 of an amplitude comparator circuit 68. The circuit 68 can comprise a resistor capacitor storage circuit which charges positive in response to signals provided to input terminal 64 and negative in response to signals provided to input terminal 66. In the event that the capacitor is charged more positive than a certain threshold value, an enabling signal is applied to output terminal 70. On the other hand, in the event that the capacitor is charged more negative than a certain threshold value, then an enabling signal is applied to output terminal 72.

Output terminal 70 is connected to the input of And gates 74 and 76 while output terminal 72 is connected to the input of And gates 78 and 80. Whether the track to be selected is an odd or even track is represented by the last stage 82 of the address register 22 (FIGURE 1). If an even track is being selected, the stage 82 will be false and if an odd track is being selected the stage 82 will be true. The true output terminal of stage 82 is connected to the input of And gates 74 and 78 while the false output terminal of stage 82 is connected to the input of And gates 76 and 80.

Let it be assumed that the amplitude of the signal passed by And gate 52 is greater than that passed by And gate 54 because the positioning head 28 is closer to an even row. As a consequence, the output terminal 70 of circuit 68 will provide an enabling signal to And gates 74 and 76. If an odd track is being selected, the positioning head 28 must be moved in, that is toward the shaft 12 and thus the And gate 74 provides an IN control signal to the positioner means 20. On the other hand, if an even track is being selected, And gate 76 will be enabled to move the positioning head 28 out away from the shaft 12. Movement of the positioning head 28 will tend to equalize the signals passed by the gates 52 and 54 until the circuit 68 fails to provide an error signal sufficient to enable any of the gates 74, 76, 78, and 80. Accordingly, the positioning head 28 will continue to be moved until it reaches a position in which it straddles an annular boundary line thereby aligning the other heads 14 with the appropriate track center line.

Figure 6:
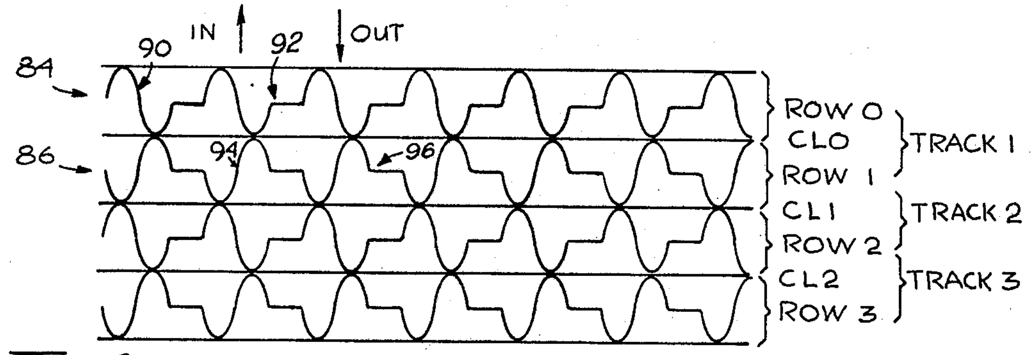
FIGURE 6 illustrates signals recorded on a positioning surface in accordance with a second embodiment of the invention.

Attention is now called to FIGURE 6 which illustrates a second embodiment of the invention in which a first signal 84 is continuously recorded on each of the positioning surface even rows and a second signal 86 is continuously recorded on each of the positioning surface odd rows. In the embodiment of FIGURE 6, the first and second signals are of the same frequency but of opposite phase. More particularly, note that the first signal recorded in rows 0 and 2 of FIGURE 6 is comprised of sine wave cycles spaced by substantially at shoulder portions. The shoulder portion in the first signal 84 occurs between a negative half cycle and a positive half cycle. Thus, the first signal recorded in the even rows is characterized by a large or continuous negative slope 90 (i.e. from a positive peak to a negative peak) and a discontinuous or smaller positive slope 92 (i.e. from a negative peak to a positive peak). The second signal 86 recorded in the odd rows on the other hand is 180° out of phase with the first signal and incorporates the substantially flat shoulder portion between a positive half cycle and a negative half cycle. Thus, the second signal 86 is characterized by having larger positive slopes 94 and smaller negative slopes 96. The "slope" of a signal as used herein refers to the rate of change of the signal. Thus, signal 84 has a larger negative slope than positive slope because the average rate of change in a negative direction (i.e. from a positive peak to a negative peak) exceeds the average rate of change in a positive direction (i.e. from a negative peak to a positive peak).

Figures 7, 8:
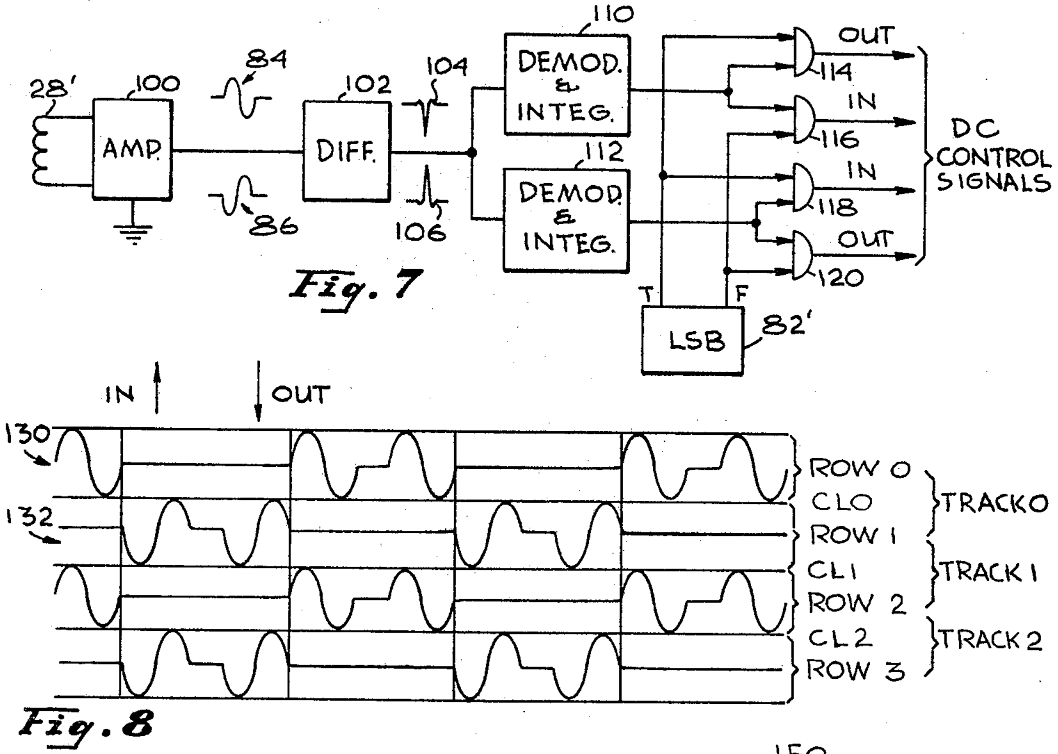
FIGURE 7 is a block diagram illustrating circuit apparatus responsive to signals provided by a positioning head used in conjunction with a positioning surface of the type illustrated in FIGURE 6 for controlling the position of that head.
FIGURE 8 illustrates signals recorded on a positioning surface in accordance with a third embodiment of the invention.

The signals 84 and 86 are read by the positioning head 28' and applied to an amplifier 100 (FIGURE 7). The output of the amplifier is applied to a differentiator circuit 102. The signal 84 applied to the input of the differentiator circuit 102 produces a negative spike 104 between a pair of small positive excursions. The second signal 86 on the other hand produces a positive spike 106 at the differentiator circuit output between a pair of small negative excursions. The output of the differentiator circuit 102 is applied to first and second demodulating and integrating circuits 110 and 112. The circuit 110 develops the envelope of the negative spikes 104 and stores the integral thereof. Circuit 112 similarly operates on the positive spikes 106. If the positioning head 28 is closer to an even row than an odd row, the signal applied to the circuits 110 and 112 will be predominantly negative and circuit 110 will thus provide an enabling signal at its output terminal. If on the other hand the positioning head 28 is closer to an odd row, the signal applied to the input of the circuits 110 and 112 will be predominantly positive and an enabling signal will thus be provided on the output terminal of circuit 112. The output terminal of circuit 110 is connected to the input of And gates 114 and 116 and the output terminal of circuit 112 is connected to the input of And gates 118 and 120.

If an even track is being sought, the false output terminal of the least significant stage 122' of the address register 22 will enable gates 116 and 120. If the positioning head 28' is too close to the even row and an even track is being sought, then the positioning head 20 must be moved in and thus the output of gate 116 provides an IN control signal. The output of gate 120 on the other hand provides an OUT control signal.

If on the other hand an odd track is being sought, gates 114 and 118 will be enabled. If the positioning head 28' is too close to an even row, then the positioning head 28' must be moved outwardly. Accordingly, gate 114 provides an OUT control signal. The output of gate 118 must therefore provide an IN control signal.

Attention is now called to FIGURE 8 which illustrates a third embodiment of the invention which employs some of the features of each of the initial two embodiments. More particularly, the first and second signals 130 and 132 respectively recorded in the even and odd rows as shown in FIGURE 8, are recorded in short bursts similar to the manner of recording utilized in the embodiment of FIGURE 1. However, the signals 130 and 132 are of opposite phase similar to the signals 84 and 86 employed in the second embodiment of the invention.

Figure 9:
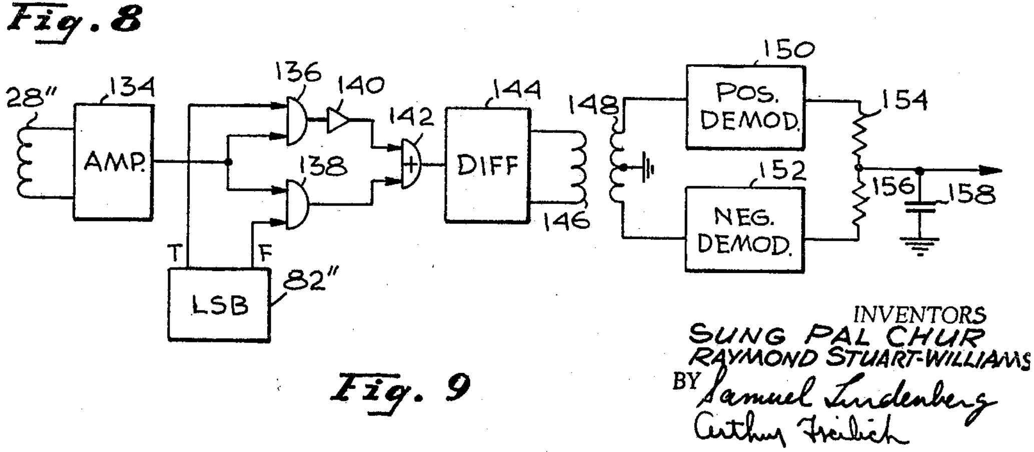
FIGURE 9 is a block diagram illustrating circuit apparatus responsive to signals provided by a positioning head used in conjunction with a positioning surface of the type illustrated in FIGURE 8 for controlling the positioning of that head.

The circuit apparatus of FIGURE 9 is utilized with the positioning head 28" responsive to signals recorded on the positioning surface of the type shown in FIGURE 8. The head 28" in FIGURE 9 is connected to an amplifier 134 whose output is connected to the input of And gates 136 and 138. A second input to And gate 136 is derived from the true output terminal of the least significant stage 82" of the address register 22. The second output to And gate 138 is derived from the false output terminal of stage 82". As previously defined, stage 82" is false when an even track is being sought and true when an odd track is being sought. The output of gate 136 is connected through an inverter 140 to the input of Or gate 142. The output of And gate 138 is connected directly to the input of Or gate 142 whose output is connected to the input of differentiator circuit 144. The output of the differentiator circuit 144 appears across a transformer primary winding 146. A transformer secondary winding 148 has a grounded center tap and first and second terminals respectively connected to positive and negative demodulator circuits 150 and 152. The outputs of circuits 150 and 152 are connected across serially connected resistors 154 and 156. A capacitor 158 is connected between ground and the junction between resistors 154 and 156 which also provides the error control signal.

Let it be assumed that an even track is being sought so that stage 82" is false and thus enables gate 138. The signal provided by the amplifier 134 to the differentiator circuit 144 will thus not be inverted. If the positioning head 28" is straddling an annular boundary line, then alternate series of positive and negative spikes will appear at the transformer primary winding 146 and will be induced in the secondary winding 148. Thus, no residual charge will be built up on capacitor 158 and no control signal will be provided to the positioner means 20 to move the positioning head 28". If the positioning head 28" is closer to an even track however the output of the differentiator 144 will be predominantly negative and thus will build up a negative charge on the capacitor 158. In this situation, it is necessary to move the positioning head out or away from the shaft 12. Thus, the positioner means 20 is responsive to a negative charge on the capacitor 158 to move the heads outwardly. If on the other hand the head 28" was closer to an odd row, the differentiator circuit would tend to charge the capacitor 158 positive and would appropriately move the positioning head inwardly.

If on the other hand an odd track is being sought, gate 136 will be enabled and the signal applied to the differentiator circuit 144 will be inverted. Accordingly in this situation, when the head 28" is too close to an even row, the differentiator will develop a positive spike and when the head is too close to an odd row, the differentiator will develop a negative spike. As noted, when a positive charge is built up on capacitor 158, the head is moved inwardly and when a negative charge is built up the head will move outwardly.

From the foregoing, it should be appreciated that several emodiments of a servo positioning system have been shown herein for precisely positioning a head over the center line of a disc track. The system makes use of a positioning surface on which first and second signals are recorded in rows defining boundary lines therebetween which are in alignment with the track center lines. Although different circuit embodiments (e.g. FIGURES 5, 7 and 9) have been illustrated as being employed with each different recording technique (i.e. FIGURES 4, 6 and 8) it should be appreciated that the circuits of FIGURES 7 and 9 can be used interchangeably. That is, the circuit of FIGURE 9 is well adapted for use with the technique of FIGURE 6 and the circuit of FIGURE 7 can be employed with the technique of FIGURE 8.

What is claimed is:

1. A disc recording system comprising:

a plurality of discs each having at least one recording surface;

means supporting said discs in stacked relationship for rotation about a common axis;

a first of said recording surfaces defining a plurality of concentric annular odd and even data tracks thereon;

a head assembly including a data head mounted for movement perpendicular to said common axis proximate to said first recording surface;

address means defining one of said data tracks;

positioning means responsive to said address means for moving said data head to said defined data track; and servo means for precisely positioning said data head over the center of said defined data track, said servo means including a second recording surface defining a plurality of concentric annular odd and even positioning rows thereon separated by annular boundary lines, each such boundary line being aligned with the center of a different one of said tracks;

a first signal having a frequency $f_1$ recorded in all of said odd rows, said first signal being characterized by having a larger positive slope than negative slope;

a second signal having a frequency $f_1$ recorded in all of said even rows, said second signal being characterized by having a larger negative slope than positive slope;

a positioning head secured to said data head for movement together therewith proximate to said second recording surface; and circuit means responsive to the magnitudes of said first signal positive slope and said second signal negative slope read by said positioning head being unequal for moving said positioning head to equalize said magnitudes.

2. The system of claim 1 wherein said circuit means includes differentiating means; and means applying said signals read by said positioning head to said differentiating means.

3. The system of claim 1 including integrating means; and means coupling said differentiating means to said integrating means.

4. The system of claim 1 including an inverting circuit and a non-inverting circuit connected in parallel between said positioning head and said circuit means; and means for enabling said inverting circuit when said address means defines an even data track and said non-inverting circuit when said address means defines an odd track.

5. The system of claim 1 wherein said second recording surface also defines a plurality of sectors having radial boundary lines therebetween; and wherein said first signal is recorded in said odd rows in alternate sectors; and said second signal is recorded in said even rows in alternate sectors different from those sectors in which said first signal is recorded.

References Cited

UNITED STATES PATENTS 3,156,906 11/1964 Cummins --------- 340—174.1

TERRELL W. FEARS, Primary Examiner

W. F. WHITE, Assistant Examiner

U.S. Cl. X.R.

179—100.2